United States Patent
Raphael

(10) Patent No.: US 9,521,929 B1
(45) Date of Patent: Dec. 20, 2016

(54) SELF CLEANING TRIBOLOGICAL COATED TOBACCO AND HERB GRINDERS

(71) Applicant: Vermont Herb & Spice Accessories, Inc., Sandgate, VT (US)

(72) Inventor: Frederick R. Raphael, Sandgate, VT (US)

(73) Assignee: Vermont Herb & Spice Accessories, Inc.

( * ) Notice: Subject to any disclaimer, the term of this patent is extended or adjusted under 35 U.S.C. 154(b) by 18 days.

(21) Appl. No.: 14/541,813

(22) Filed: Nov. 14, 2014

Related U.S. Application Data

(60) Provisional application No. 61/905,982, filed on Nov. 19, 2013.

(51) Int. Cl.
| | | |
|---|---|---|
| *A47J 42/38* | (2006.01) | |
| *A47J 42/24* | (2006.01) | |
| *B02C 19/00* | (2006.01) | |

(52) U.S. Cl.
CPC .............. *A47J 42/38* (2013.01); *A47J 42/24* (2013.01); *B02C 19/00* (2013.01)

(58) Field of Classification Search
CPC ............ A47J 42/12; A47J 42/14; A47J 42/20; A47J 42/32; A47J 42/34; A47J 42/38; B02C 9/00
USPC .... 241/168, 169, 169.1, 273.3; 131/105–110
See application file for complete search history.

(56) References Cited

U.S. PATENT DOCUMENTS

| | | | |
|---|---|---|---|
| 3,942,230 A | 3/1976 | Nalband | |
| 3,957,214 A * | 5/1976 | Berggren | B02C 7/08 241/246 |
| 5,066,388 A * | 11/1991 | Ross | B01D 11/0257 208/425 |
| 5,197,681 A * | 3/1993 | Liebermann | B26D 1/36 241/282 |
| 6,293,480 B1 * | 9/2001 | Tseng | B02C 17/20 241/184 |
| 7,147,174 B2 | 12/2006 | Mansen | |
| 7,422,170 B2 | 9/2008 | Bao | |
| 8,083,167 B1 * | 12/2011 | Namakian | 241/169.1 |
| 8,393,563 B2 | 3/2013 | Chaoui et al. | |
| 8,733,679 B2 * | 5/2014 | Camitta | B02C 18/16 241/169.1 |
| 2003/0025014 A1 * | 2/2003 | Sun | B02C 19/06 241/39 |
| 2003/0080224 A1 * | 5/2003 | Rowley, Jr. | F26B 17/10 241/5 |
| 2007/0262182 A1 * | 11/2007 | de Groote | A47J 19/04 241/169.1 |
| 2009/0072057 A1 * | 3/2009 | Enderle | B02C 17/16 241/29 |

(Continued)

FOREIGN PATENT DOCUMENTS

EP 0285722 B1 1/1992

*Primary Examiner* — Faye Francis
(74) *Attorney, Agent, or Firm* — Barnes & Thornburg LLP; Joan T. Kluger

(57) ABSTRACT

A tobacco and herb grinder suitable for grinding many dried plant products, having two interfacing sets of knives or pins with low friction omniphobic coated parts that inhibit the adherence of plant material buildup. The grinder inhibits the accumulation of resins or oils and, thus reduces or eliminates binding and the necessity for removing debris by use of a particular combination of knife blades and coatings.

14 Claims, 3 Drawing Sheets

(56) References Cited

U.S. PATENT DOCUMENTS

| | | | |
|---|---|---|---|
| 2010/0213299 A1* | 8/2010 | Campe | B02C 18/144 241/276 |
| 2011/0017853 A1 | 1/2011 | Smith et al. | |
| 2012/0018561 A1* | 1/2012 | Wulf | A47J 43/042 241/285.1 |
| 2013/0214073 A1 | 8/2013 | Scharf et al. | |
| 2014/0217213 A1* | 8/2014 | Edwards | A47J 42/40 241/69 |
| 2014/0374519 A1* | 12/2014 | Davis | A23G 9/12 241/101.8 |

* cited by examiner

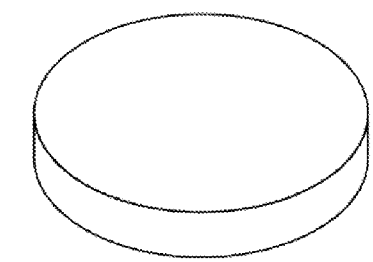
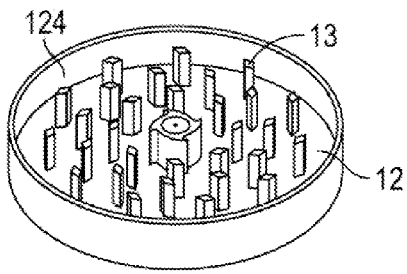
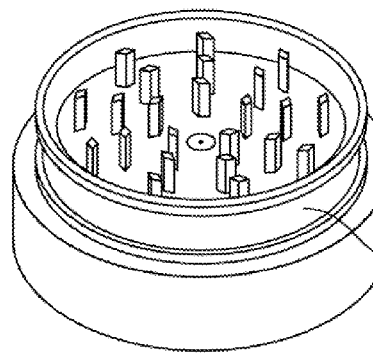
FIG. 6    FIG. 7
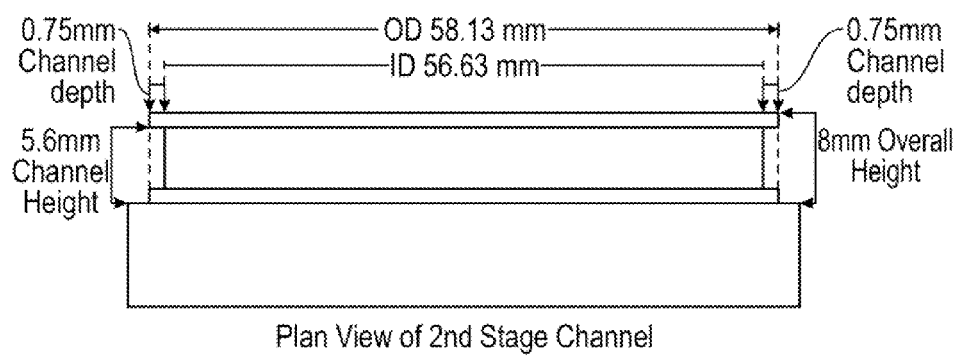
Plan View of 2nd Stage Channel
FIG. 8

SELF CLEANING TRIBOLOGICAL COATED TOBACCO AND HERB GRINDERS

BACKGROUND OF THE INVENTION

Devices for grinding dried plant products exist but generally suffer from material buildup problems resulting in poor performance and requiring frequent cleaning. Cleaning is often difficult because of the existence of numerous small knife components making cleaning difficult and time consuming. Therefore, a grinder that reduces the frequency of needed cleaning and inhibits or eliminates material buildup is needed.

SUMMARY OF THE INVENTION

The invention is a tobacco and herb grinder suitable for grinding many dried plant products, having two interfacing sets of knives or pins with low friction omniphobic coated parts that inhibit the adherence of plant material buildup.

The grinder inhibits the accumulation of resins or oils, and thus, reduces or eliminates binding and the necessity for removing debris, by use of a particular combination of knife blades and coatings.

DRAWINGS

FIG. 6 depicts a grinding device having a circumferential channel according to an illustrative embodiment of the invention.

FIG. 7 depicts the grinder of FIG. 6 showing the knives in two sections of the device according to an illustrative embodiment of the invention.

FIG. 8 depicts a side view of a grinder having a channel according to an illustrative embodiment of the invention showing illustrative dimensions.

DESCRIPTION OF THE INVENTION

Figure 1:
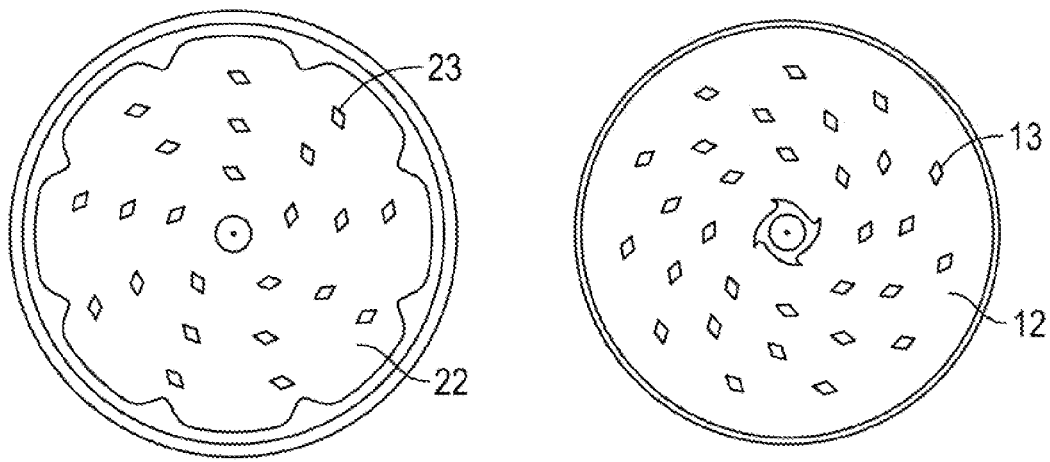
FIG. 1 depicts a plan view of a top and second stage of a grinder according to an illustrative embodiment of the invention.

Many devices for grinding tobacco and other plant materials have been designed using two interfacing sets of knives or pins. The plant material is placed between the knives and one set of knives is rotated around the axis of the stationary set of knives to grind the plant material. The ground material is collected for use either from between the lower knives or drops through holes between the lower blades into a collection compartment depending upon the particular embodiment of the grinder. However, tobacco and most plant materials, unless they have been completely desiccated, retain some water and/or oils. As the material is heated through the rotary motion of grinding even small amounts of liquids present in the material will cause it to clump and adhere to the various surfaces to which it is exposed. Over time this residue will build up on the areas of the device exposed to the plant material. This makes the grinder difficult to turn, hard to empty of the ground material and difficult to clean. In short, the device sticks.

Existing devices have a common shortcoming, namely, the knives becomes dirty or occluded by the accretion of material on the surfaces of the device. If the blades are not cleaned shortly after use this adhesive material can harden and becomes progressively more difficult to clean. This accreted debris subsequently attracts more debris in following uses and eventually the purpose of the cutting device becomes compromised.

To address these issues wear resistant tribological coatings with omniphobic properties and a low coefficient of friction against these plant materials that are "self cleaning" are applied on the interior surfaces of the grinder in contact with the plant materials. These are coatings that are both hydrophobic, oleophobic and have a low coefficient of friction. Use of these coatings resolves or significantly reduces the problem of accretion. Further, it is desirable that the exterior of the device receive a decorative coating or that the tribological coating be attractive in itself.

It is common for 2-3% of the material being ground to accumulate on the grinding surfaces of these devices. Once approximately 100 grams of material have been passed through the device, a rind of up to about 3 mm thickness will have accumulated on the principle rotating surfaces. The device is then stiff and difficult to operate until it has been cleaned. Self cleaning coatings can prevent the ground vegetation from accumulating on these surfaces and then becoming lost in surfactant cleaning. Furthermore, the reduction in entropy from the buildup of oils and resins on the rotating surfaces of a grinding or comminuting device with an axial rotation results in a lower friction device that requires minimal force to turn. The use of omniphobic coatings to eliminate or significantly reduce the buildup of accreted plant material on the inner surfaces of a tobacco and herb grinder has not been previously described.

Furthermore, certain surfaces of the grinder are subject to frictional forces that abrade these surfaces. These surfaces may require different coatings than the cutting surfaces. Harder self cleaning coatings that prevent abrasion of the surfaces subject to metal on metal friction can be used to where there is direct metal to metal contact.

Finally, the device may have a decorative coating which could constitute a third type of coating. A durable exterior coating that is desirable for aesthetic purposes may incorporate the same properties as the interior non-cutting surfaces that may be in frictional contact. Our invention addresses or solves these problems.

The first force acting on these devices is adhesion of the ground particles to the upper plate and lower plate supporting the upper knives and the lower knives. In FIG. 1, the upper plate is 12 and the lower plate is 22.

The knives, 13 and 23, do not become overly coated with residue because their lower surface area and relatively high rotational speed do not impart sufficient energy to heat the plant materials and create as much adhesion as the plates. However, because the plant material is in constant contact with the plates to which they are attached and because the plates have less angular momentum and a lower imparted energy level, they are cooler and attract the heated resins in the plant material which then adhere to the upper and lower plates. Eventually this builds up and blocks the action of the knives. This is a progressive process with the prior material attracting and adhering the new material that it comes in contact with. Therefore, these plates have a coating that exhibits a low surface energy to overcome the attractive force of the heated resins to the cooler plates and prevent adhesion. In practical terms, because the plates and the knives are formed from a single piece, both the plates and the knives receive an omniphobic coating.

Furthermore, depending on the particular embodiment of the device, there may be other interior surfaces which will become coated with plant material over time. While this is more of an aesthetic issue rather than a functional problem, it can be resolved by using one coating throughout the device. In addition, because the coating, in certain embodiments, can be made durable as well as self cleaning it can be applied to both the interior and exterior surfaces rather than requiring separate coatings for the different elements which can be a very costly process.

These coatings can be used on various types of grinders. In particular a grinder such as that depicted in U.S. Pat. No. 7,422,170 to Bao could be used with the coatings. (The Bao device includes magnetic securing devices, which can optionally be included.) Additional illustrative grinders include the devices taught by Wingfield and Bailey in the 1905 U.S. Pat. No. 795,746, Mansen in U.S. Pat. No. 7,147,174 B2 and Chaoui/Wang Xin in U.S. Pat. No. 8,393,563 B2, all drawings and descriptions of features of the drawings of the aforementioned patents are incorporated herein by reference. Generally, grinders with detachable teeth plates are suitable for use with this invention as well as devices where the plates and knives are integrated with other parts.

Additional designs include:

a device similar to Bao with four stages where the upper and lower teeth are integral to the cover and the second section; and a simpler two stage arrangement similar to Wingfield and Bailey's design where the cover and the upper plate and knives are made from a single block of material and the second stage, lower plate and bottom knives are likewise made from a single block of material. The teeth are integral to the upper and lower sections but there are no holes to drop the ground material through to a third and fourth section.

In a further embodiment, the separate teeth plates of the Bao design and the two stage arrangement of the Wingfield and Bailey design (without holes in the second stage) can both be incorporated in a two stage grinder to allow a separate coating for the separable teeth plates and a decorative coating on the other parts.

The two stage design with separable teeth is described in more detail here.

The coatings described for use on the separable teeth plates in this invention are characterized by a low surface energy and by surface roughness either on the micro scale or the nano scale. They are omniphobic and exhibit low coefficients of friction. The self cleaning materials described have good release properties. An appropriate coating for the knife plates of this device has a contact angle for both water and oil of greater than ninety degrees and a coefficient of friction of less than 0.35 measured against the specific material to be ground. An illustrative range of coefficient of friction to be used for the grinder parts is about 0.20 to about 0.37 against various dried plant materials. The specific choice of coating will be at least in part based on the coefficient of friction between the coating and the material to be ground. The coefficients of friction can be determined by means known in the art. A description of the coatings follows.

Omniphobic non-wetting surfaces with low surface energy that are suitable for release coatings of the device include fluorocarbons, polycarbonates, silanes and ceramics combined with composite materials. Many compounds within these groups exhibit low surface energy and have self cleaning properties appropriate for coating grinding or comminutive devices used with plant materials.

Figure 2:
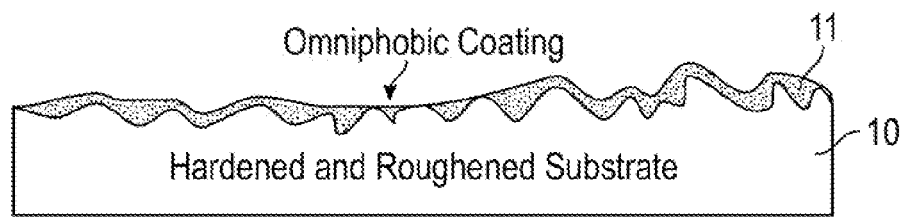
FIG. 2 is a diagram of an omniphobic coating on a roughened substrate according to an illustrative embodiment of the invention.

Referring to FIG. 2, the plates and knives of the substrate, 10 are first roughened by abrading it with aluminum oxide to an approximately 100-250 microns texture. The roughened substrate may then be hardened, if desired, by coating with a preferably corrosion resistant metal having a high degree of hardness. An illustrative range of hardness is macro hardness of greater than about 58 RC and preferably about 72 RC or greater The metal can be applied in vapor form using conventional techniques such as airless spray, electrostatic, HVOF (High Velocity Oxygen Fuel), plasma vapor deposition and combustion wire process. Alternatively, if the substrate is aluminum a hard-coat (Type III) anodizing may be applied to the substrate.

Furthermore, hardening of the substrate by the application of a metal hard coat followed by an omniphobic non-wetting coating increases the durability of the device. In an illustrative embodiment of the invention, the omniphobic non-wetting coating is a polymer. The substrate may be steel, stainless steel, aluminum, brass, bronze, plastics and zinc.

In another embodiment, a ceramic coating may be applied to the textured surface, 10, using any suitable coating method. In an illustrative embodiment of the invention, the ceramic coating is applied using a plasma vapor deposition process. Ceramics are generally characterized by low coefficients of friction. Suitable ceramics include titanium carbide, titanium nitride, chromium nitride, boron nitride, chromium carbide, molybdenum carbide, titanium carbonitride, electroless nickel, zirconium nitride, fluorinated silicon dioxide, titanium dioxide. tantalum oxide, tantalum nitride, diamond-like carbon, fluorinated diamond-like carbon, and/or combinations thereof.

In both embodiments an omniphobic (non-wetting) coating, 12, is then applied from a list, of materials which includes, for example: silicon carbide, fluorosilicone, fluoroacrylate, hexafluoropropylene, fluoroeurathane, fluorosilane, chlorosilanes, silicone, polydimethylsiloxane (PDMS), aluminum magnesium boride, fluorinated Polyhedral Oligomeric SilSesquioxanes (FluoroPOSS), and/or combinations of the above. The chosen release coating is applied to the prepared surface and cured as is appropriate for that coating. In certain embodiments the coating will be composed of nano silica spheres sintered and treated with fluorosilane.

Polytetrafluoroethylene (PTFE) should generally not be used as a coating for this device due to the possibility of a very small quantity of the coating dislodging and becoming incorporated in the ground tobacco and then incinerated and inhaled. Incinerated PTFEs are a known carcinogen and can also give rise to "Teflon flu syndrome".

In use, the surface roughening serves two purposes. Whether on the micro or the nanoscale, the ridges and valleys are smaller than the particles being ground. Rather than adhering to the surface, the particles slide or bump over these minute irregularities. Initially the release coating smooths these transitions. Over time, as the release coating wears, it reveals the peaks of the hardened substrate which protect the release coating in the adjacent valleys from further abrasion. That is, the peaks of the hardened metal substrate protect the pockets of release coating that surround them and the wear of the release coating is mitigated.

In the two stage embodiment with separable teeth, the teeth plates are then joined with the top and bottom structures, which may have previously received a decorative coating.

The remaining inner surfaces of the device can be coated in a like manner as the knives and plates.

Figures 3, 4:
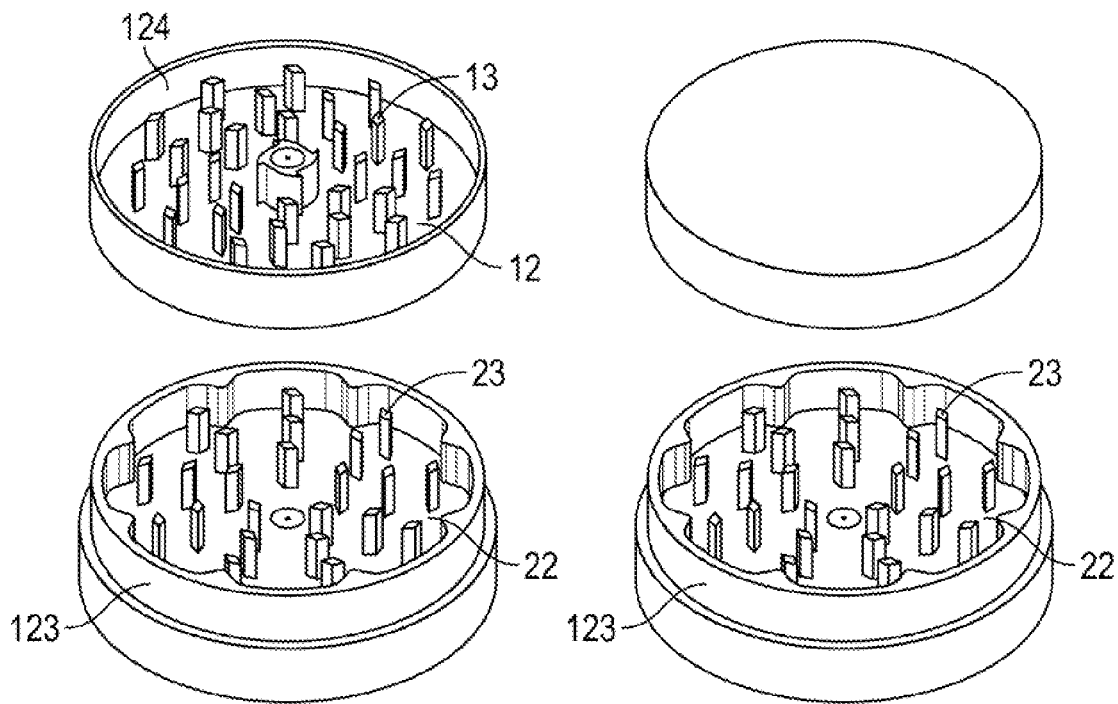
FIG. 3 is a perspective view of a top and second stage of a grinder according to an illustrative embodiment of the invention.
FIG. 4 shows a grinding device according to an illustrative embodiment of the invention.

FIGS. 3 and 4 depict a grinder according to an illustrative embodiment of the invention. Both the top and bottom portions have grinding teeth, with the top portion also serving as a lid. In this and other embodiments components can be reversed as to what would be considered the "top" or "bottom" of the apparatus.

Figure 5:
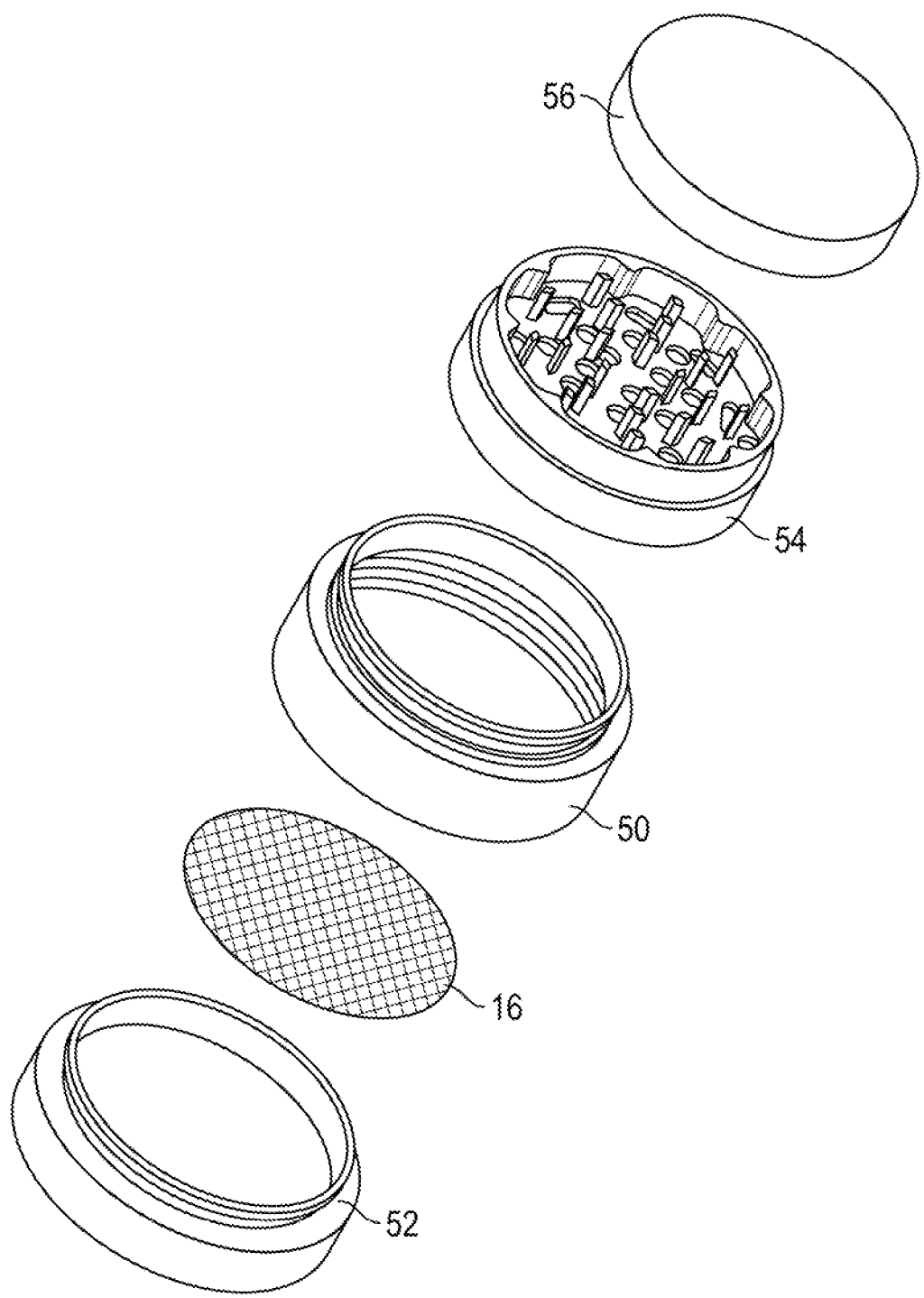
FIG. 5 is an exploded view of a grinding device according to an illustrative embodiment of the invention.

FIG. 5 shows an exploded view of a grinder according to an illustrative embodiment of the invention. Screen 16 is secured to the ring component 50 shown above it. Bottom component 52, shown below screen 16, has a solid bottom and is attachable to ring 50, in this embodiment through threaded engagement. Ring 50 is further attachable to a bottom grinding component 54, which in turn is slidably attachable to top grinding component 56.

Referring to FIGS. 6 and 7, abrasive forces exist between the inner lip of the top 124 and the outer lip of the second stage, 123, which are in close contact during the rotation of the top against the second stage. Small particles of ground material can become lodged in this area over time creating friction that can either wear down the surface of the device or cause the rotating surfaces to stick making it difficult or impossible to turn the top to actuate the grinding process. This area requires either a coating that is quite hard to be viable or a cutback to the second stage outer edge, such as channel 125 shown in FIGS. 6 and 7, to reduce the surface area in contact with the inner lip of the top. Reducing the surface area between the inner surface 124 of the top and the outer surface 123 of the second stage by creating a small channel 125 along the outer surface of the second stage allows the material to fall out before it becomes compressed and eliminates this problem. Illustrative channel width ranges are about 60% to about 80% of the outer surface of the upper portion of the bottom component of the device (i.e. width of channel 125 as a percentage of surface 124) A further illustrative range is about 65% to about 75%. Illustrative discrete channel depth ranges are about 40% to about 60%, and about 45% to about 55%.

FIG. 8 shows illustrative dimensions of channel 125.

Furthermore, adhesive forces on the remaining inner surfaces of the grinder due to the resins and the normal force of gravity as they travel through the device require the application of a similar coating. Since these surfaces are part of the same surfaces, that if desired, may have a high hardness coating, it is desirable that these surfaces receive the same coating as the other interior surfaces of the device.

Furthermore, it is desirable that the exterior of the device have a durable decorative coating that is sufficiently hard to withstand scratching and chipping in normal use for an extended period of time. Therefore the coating of the interior surfaces, if sufficiently attractive, may be applied to the exterior surfaces as a durable decorative coating. Otherwise significant masking could be necessary during the interior coatings and then a second coating applied to the exterior would be necessary.

Finally, all of the coatings should meet USDA/FDA requirements for food contact and tobacco use.

Unlike existing grinders, the low friction, self cleaning, omniphobic coatings are presented on all of the interior surfaces of the grinder with which the plant materials will come in contact.

There are an abundance of coatings, including many that are of recent design, that will suit the needs of this invention. However, the most appropriate will have the characteristics described above.

These coatings use high temperature curing processes. In an illustrative embodiment, the temperature is greater than about 500° F. and less than about 800° F. For particular applications, a temperature of about 500° F. is desirable. If the plates are separable from the device, then it is typically necessary that the plates containing the cutting knives be removed from the supporting components to avoid warping of the plates.

The coefficient of friction ($\mu$) for the appropriate omniphobic coating materials to use, which depends at least in part on temperature and humidity.

The implications of this are that determining a proper coating with a low coefficient of friction for this device cannot be derived from any published data but must be determined specifically for each material that might be used in the device. For example, using samples of pipe tobacco and dried basil, widely varying $\mu$ values were obtained with a variety of coatings. Ten coatings tested against tobacco had an average $\mu$ of 0.47 and ranged from 0.36 to 0.64. Against basil they ranged from a low of 0.22 to 0.41 with an average of 0.30.

Three of the ten coatings had the lowest $\mu$ on all the test materials. The fact is that there may be hundreds of potentially viable release candidates in the world of materials coatings. However, for consideration in this application viable candidates have the same three characteristics: a non-uniform surface, a metallic hardening coat and a top coating from the list of omniphobic coatings provided above.

If the device is only intended for grinding tobacco, then the surface texture should be in the range of 100-250 microns, coated with an an omniphobic material resulting in a coefficient of friction less than 0.35 against various dried plant materials which defines the appropriate coating for a grinder of this type in general use. In the preferred embodiment a silicon carbide coating applied to the separable teeth plates is suitable.

A description of the method for determining the coefficient of friction between the coating and the ground material according to an illustrative embodiment of the invention is as follows:

The coefficient of friction between the coating and the plant material in question can be determined by preparing a rectangular plate made of any rigid material such as aluminum and adhering a representative ground sample of the plant material that will be used in the device. The plate with the ground material is then affixed to a two-axis goniometer, which is leveled and the plate with the ground material is affixed thereto. A sample plate surfaced with the coating to be tested is cleaned with a degreasing solution and placed on top of the sample coated with the ground material. The goniometer is then rotated until it exceeds the angle of repose and the coating sample begins to slide across the ground material. This angle is carefully noted and the tangent of that angle determined. This process is repeated a number of times (at least five) and the resulting tangents are then averaged. The average tangent determined by this method is the coefficient of friction between the sample of ground material and the coating in question. This test may then be repeated with different coatings until the coating with the lowest coefficient of friction for this particular application is determined.

Determining a suitable coating can include balancing the coefficient of friction with other characteristics of the coating such as durability.

The invention claimed is:

1. A grinder to grind dry plant material comprising:
a top lid portion and a first bottom portion wherein the top lid portion is slidably interfaced with the first bottom portion to form a grinding compartment;
the grinding compartment having interior surfaces, wherein interior surfaces come in contact with the plant material during operation of the grinder;
the top lid portion having an upper plate and a plurality of knives extending therefrom into the grinding compartment, the surfaces of which are included in the interior surfaces; and
the first bottom portion having a lower plate with a plurality of knives extending therefrom into the grinding compartment, the surfaces of which are included in the interior surfaces;
wherein the interior surfaces have a surface texture in the range of 100-250 microns;
wherein the interior surfaces have an omniphobic coating, other than polytetrafluoroethylene, having a coefficient of friction in the range of 0.20 to 0.37 against various dried plant materials; and
the omniphobic coating having a contact angle for both water and oil of greater than 90°; and
wherein the lower plate plurality of knives, the upper plate plurality of knives, the lower plate and the upper plate are coated with the same coating as one another.

2. The grinder of claim 1 comprising interior surfaces having a coefficient of friction less than 0.35 against various dried plant materials.

3. The grinder of claim 1 wherein the top lid portion, first bottom portion, grinding compartment, upper plate, and lower plate have a substrate selected from the group consisting of steel, stainless steel, aluminum, brass, bronze, plastics and zinc,
a metal hardcoat disposed on the substrate; and
an omniphobic non-wetting polymer disposed on the metal hardcoat.

4. The grinder of claim 3 wherein the substrate is aluminum, having a hard-coat, type III, anodizing coating.

5. The grinder of claim 1 wherein the omniphobic coating is ceramic or contains ceramic.

6. The grinder of claim 1 further comprising a channel in an outer wall of the first bottom portion.

7. The grinder of claim 6 wherein the channel has a depth of about 45% to about 55% of the thickness of the wall.

8. The grinder of claim 6 wherein the channel has a width of about 65% to about 75% of the width of the wall.

9. The grinder of claim 1 wherein the omniphobic coating is applied at a temperature in the range of about 500° F. to about 800° F.

10. The grinder of claim 1 further comprising:
a second bottom portion threadedly engaged with the first bottom portion;
the first bottom portion having a plurality of holes in the lower plate;
wherein the perimeter of the holes and surfaces of the second bottom plate that come into contact with plant material are included in the interior surfaces coated the omniphobic coating.

11. The grinder of claim 10 further comprising:
a ring disposed between the first bottom portion and the second bottom portion and threadedly engaged with the first bottom portion and the second bottom portion; and
a screen disposed within the first bottom portion, the screen extending to the inner circumference of the first bottom portion.

12. The grinder of claim 1 wherein the grinder has exterior surfaces and interior surfaces and the exterior surfaces and the interior surfaces have the same coating as one another.

13. The grinder of claim 1 wherein the knives are integral with the plates.

14. A method of grinding plant material comprising:
providing a grinder according to claim 1;
placing plant material in the grinder; and
imparting relative rotation of the top lid portion with respect to the first bottom portion.

* * * * *